(12) United States Patent
Mooney et al.

(10) Patent No.: US 12,429,886 B2
(45) Date of Patent: Sep. 30, 2025

(54) AUTONOMOUS DETECT AND AVOID FROM SPEECH RECOGNITION AND ANALYSIS

(71) Applicant: WING AVIATION LLC, Mountain View, CA (US)

(72) Inventors: John Mooney, Felton, CA (US); Ali Shoeb, San Rafael, CA (US)

(73) Assignee: Wing Aviation LLC, Palo Alto, CA (US)

( * ) Notice: Subject to any disclaimer, the term of this patent is extended or adjusted under 35 U.S.C. 154(b) by 208 days.

(21) Appl. No.: 18/066,220

(22) Filed: Dec. 14, 2022

(65) Prior Publication Data
US 2024/0201696 A1   Jun. 20, 2024

(51) Int. Cl.
| | |
|---|---|
| *G05D 1/00* | (2024.01) |
| *B64C 39/02* | (2023.01) |
| *B64U 101/64* | (2023.01) |
| *G10L 15/26* | (2006.01) |

(52) U.S. Cl.
CPC ......... *G05D 1/1064* (2019.05); *B64C 39/024* (2013.01); *G05D 1/104* (2013.01); *G10L 15/26* (2013.01); *B64U 2101/64* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 9,886,862 B1 | 2/2018 | Burgess et al. | |
| 10,186,158 B2 | 1/2019 | Burgess et al. | |
| 10,593,219 B2 | 3/2020 | Burgess et al. | |
| 2007/0288129 A1 | 12/2007 | Komer et al. | |
| 2017/0069214 A1* | 3/2017 | Dupray | G08G 5/0008 |
| 2019/0229800 A1* | 7/2019 | Schloemer | H04B 7/18513 |

(Continued)

OTHER PUBLICATIONS

International Search Report and Written Opinion mailed Jan. 4, 2024, in corresponding International Patent Application No. PCT/US2023/035500. 13 pages.

(Continued)

*Primary Examiner* — James J Lee
*Assistant Examiner* — Melanie G Huber
(74) *Attorney, Agent, or Firm* — Christensen O'Connor Johnson Kindness PLLC (57) ABSTRACT

A technique for detecting and avoiding obstacles by an unmanned aerial vehicle (UAV) includes: querying a knowledge graph having information related to a dynamic obstacle that may be in proximity to the UAV when traveling along a planned route; comparing the location of the dynamic obstacle to the UAV to detect conflicts; and in response to detecting a conflict, performing an action to avoid conflict with the dynamic obstacle. The knowledge graph can be updated by receiving a VHF radio signal containing the information related to the dynamic obstacle in the audible speech format; translating the audible speech format to a text format using speech recognition; analyzing the text format for relevant information related to the dynamic obstacle; comparing the relevant information related to the dynamic obstacle of the text format to the knowledge graph to detect changes; and updating the knowledge graph.

25 Claims, 7 Drawing Sheets

(56) References Cited

U.S. PATENT DOCUMENTS

| | | | |
|---|---|---|---|
| 2019/0304190 A1* | 10/2019 | Johnson | G06F 3/013 |
| 2019/0385591 A1* | 12/2019 | Shin | G10L 15/28 |
| 2020/0082731 A1 | 3/2020 | Choi et al. | |
| 2021/0183360 A1* | 6/2021 | Ebrahimifard | G08G 5/0026 |
| 2023/0111581 A1* | 4/2023 | Latapie | G06N 5/022 |
| | | | 706/10 |

OTHER PUBLICATIONS

Pellegrini, T., et al., "The Airbus Air Traffic Control speech recognition 2018 challenge: towards ATC automatic transcription and call sign detection", arXiv:1810.12614v2 [cs.SD], Mar. 10, 2020, 5 pages.

Badrinath, S., et al., "Automatic Speech Recognition for Air Traffic Control Communications," Transportation Research Record, 2021, pp. 1-12.

"DialogSum: A Real-life Scenario Dialogue Summarization Dataset," https://github.com/cylnlp/DialogSum, downloaded Nov. 3, 2022, 2021, 2 pages.

Schumann, J., et al., "Model-Based On-Board Decision Making for Autonomous Aircraft," Sep. 2019, pp. 1-14.

"Speech Recognition Meets Air Traffic Control," https://www.at-one.aero/projects/speech-recognition-meets-air-traffic-control, downloaded Jul. 14, 2022, pp. 1-6.

"Speech recognition technology for air traffic controllers," https://www.internationalairportreview.com/news/75900/voice-recognition-air-traffic, downloaded Jul. 14, 2022, pp. 1-6.

Lowry, M., et al., "Towards Autonomous Piloting: Communicating with Air Traffic Control," https://arc.aiaa.org/doi/pdf/10.2514/6.2019-2207, downloaded Jul. 14, 2022, pp. 1-4.

\* cited by examiner

AUTONOMOUS DETECT AND AVOID FROM SPEECH RECOGNITION AND ANALYSIS

TECHNICAL FIELD

This disclosure relates generally to obstacle avoidance for aircraft, and in particular but not exclusively, relates to using speech recognition to assist unmanned aerial vehicles in detecting and avoiding dynamic obstacles.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments with shared airspace), the UAV should be capable of detecting and avoiding dynamic obstacles within their vicinity.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for using speech recognition to supplement other information in a knowledge graph to assist unmanned aerial vehicles in detecting and avoiding dynamic obstacles are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide a technique for UAVs to identify dynamic obstacles (e.g., air-based, water-based, and/or ground-based), at least in part from speech recognition, estimate their path of travel, and set or adjust flight paths around those obstacles to safely navigate in an obstacle-laden environment. Detect and avoid (DAA) systems for UAVs are dependent on knowing the position of static obstacles, and the position and velocity of dynamic obstacles (e.g., airplanes, other UAVs, drones, ships, vehicles, etc.) to avoid potential collisions. However, flightpaths, destinations, and pilot intent can provide a more robust knowledge graph of the obstacles in the UAV's environment to improve safety during the course of the flight. Although the following disclosure describes techniques for UAVs to avoid air-based dynamic obstacles, the embodiments disclosed herein are suitable for detecting and avoiding water- and ground-based dynamic obstacles using similar techniques, which are also within the scope of the present disclosure.

Some aircraft are equipped with Automatic Dependent Surveillance-Broadcast (ADS-B), which is a surveillance technology that combines a craft's (aircraft, watercraft, etc.) positioning source, aircraft avionics, and a ground infrastructure to broadcast accurate surveillance information for the craft. An ADS-B message includes a dynamic obstacle (e.g., aircraft, watercraft) identifier and provides information related to the dynamic obstacle's current position, heading, and speed, but do not provide a flightpath or other destination information for the craft. Further, ADS-B broadcasting is only required on certain craft (e.g., aircraft traveling in Class A, B, and C airspace; traveling in the Mode-C veil around a Class B primary airport, watercraft over a certain size, etc.), and not required on other craft. Such non-ADS-B air traffic, as well as flightpath (pilot intent) information on ADS-B and non-ADS-B craft, is not included in current data broadcasts, and as such a complete knowledge graph of the UAV's environment is not available without receiving further information. The technology disclosed herein may be suitable for use with a DAA system for any type of craft.

Radio communication (e.g., VHF radio) can provide further details about the position, velocity, flightpath, destination, and/or pilot intent of an aircraft. For example, general aviation pilots at non-towered airports self-deconflict by a combination of visual scans for other aircraft and information conveyed by pilots speaking over VHF radio. In another example, a pilot of a sightseeing helicopter may communicate information over VHF radio about circling a tourist destination several times before continuing on the planned route. In these examples, a knowledge graph of a flight environment can be improved by using speech recognition to analyze the audible speech of the pilots over the VHF radio and applying that information to the knowledge graph to enhance a UAV's DAA system. For example, the knowledge graph may contain some information about a dynamic obstacle (e.g., aircraft, watercraft, etc.) from various sources (ADS-B, radar, filed flightplan, etc.) and the VHF radio data can be associated with the dynamic obstacle's identification (tail number, flight number, etc.) and added to the information about that dynamic obstacle in the knowledge base. Embodiments of the present disclosure are suitable for creating a more complete knowledge graph, e.g., a knowledge graph comprising VHF radio data and one or more of ADS-B data and radar data. Maintaining up-to-date and robust knowledge graphs of the environment in which UAVs are operating is a significant benefit for an aerial delivery service.

Figure 1:
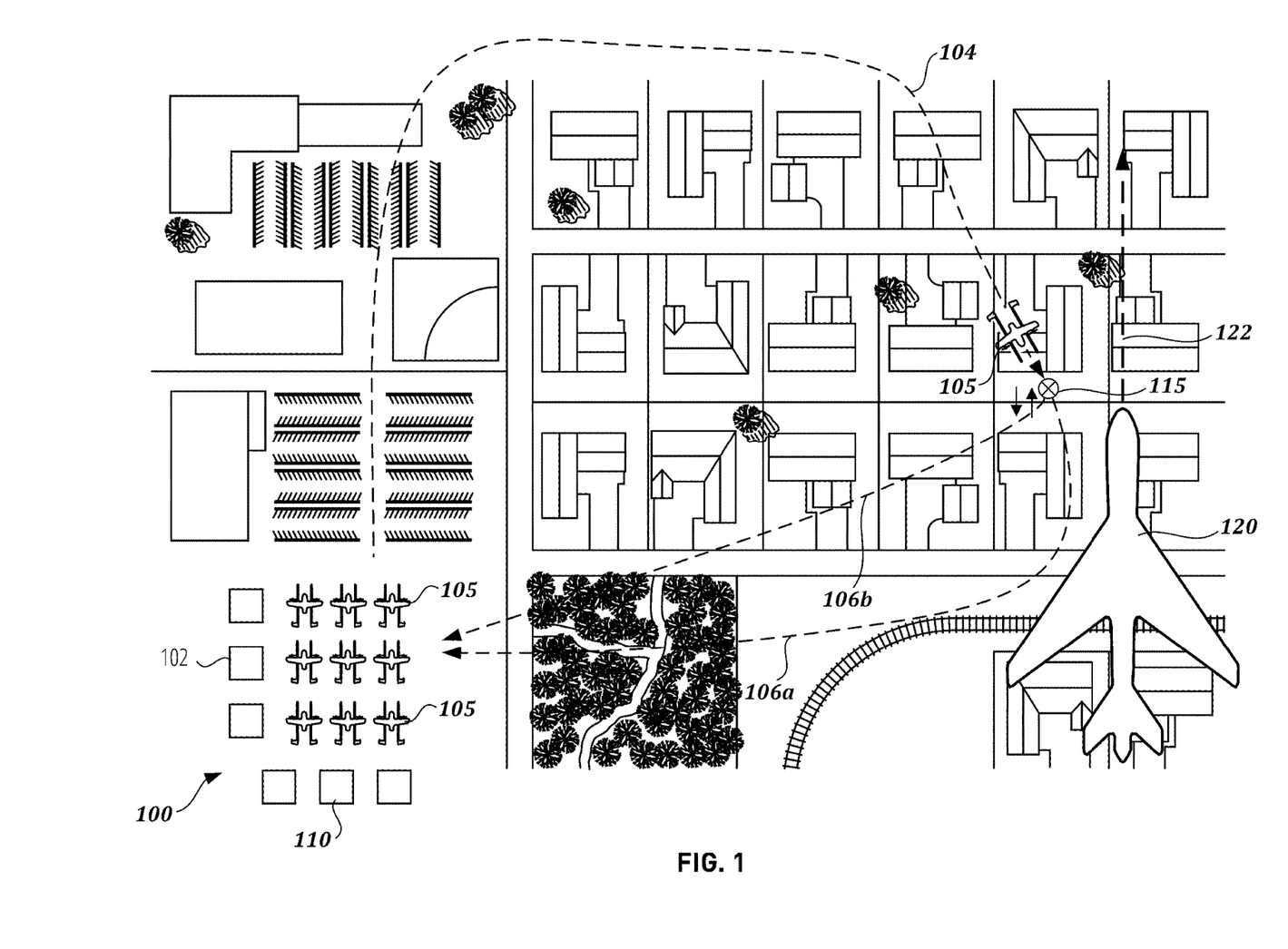
FIG. 1 illustrates a fleet of unmanned aerial vehicles (UAVs) staged at a terminal area to provide a package delivery service to a neighborhood, in accordance with an embodiment of the disclosure.

FIG. 1 is a plan view illustration of a terminal area 100 for staging UAVs 105 that deliver packages to a neighborhood, in accordance with an embodiment of the disclosure. The UAVs may one day routinely deliver small items into urban or suburban neighborhoods from small regional or neighborhood hubs such as the terminal area 100. The vendor facilities 110 may setup adjacent to the terminal area 100 to take advantage of the aerial delivery service. A typical aerial delivery mission may include loading a UAV 105 with a package from a vendor facility 110 at the terminal area 100, where it ascends to a cruise altitude to follow an approach route 104 to a customer destination 115. At the customer destination 115, the UAV 105 descends for package drop-off before once again ascending to a cruise altitude for the return journey along a planned return route 106a back to the terminal area 100.

During the course of a delivery mission, dynamic obstacles may be an ever present hazard-particularly air-based and ground-based dynamic obstacles (e.g., airplanes, other UAVs, drones, ships, vehicles, etc.). Identification and avoidance of these obstacles is important for safe UAV navigation. During flight, the control system of the UAV 105 and/or a fleet management and control system located remotely (e.g., the control system 230 of FIG. 2) can be monitoring current traffic space (e.g., airspace and ground/water space) to adjust the routes of the UAV 105 to avoid these dynamic obstacles. In one example as illustrated in FIG. 1, an airplane 120 or other aircraft may be traveling along a flightpath 122 at an elevation that interferes with the planned return route 106a of the UAV 105 after dropping off the package at the customer destination 115. In response, the UAV 105 can employ detect and avoid (DAA) systems to detect the airplane 120 and avoid the flightpath 122 by: (1) determining a safe landing location and descending to land to deconflict with the airplane 120; or (2) setting an adjusted return route 106b that changes the course of the UAV 105 to deconflict with the airplane 120. Embodiments of the DAA system may include various information related to the dynamic obstacles, which can in part be derived from speech recognition of VHF radio communications, as will be described in greater detail below.

Figure 2:
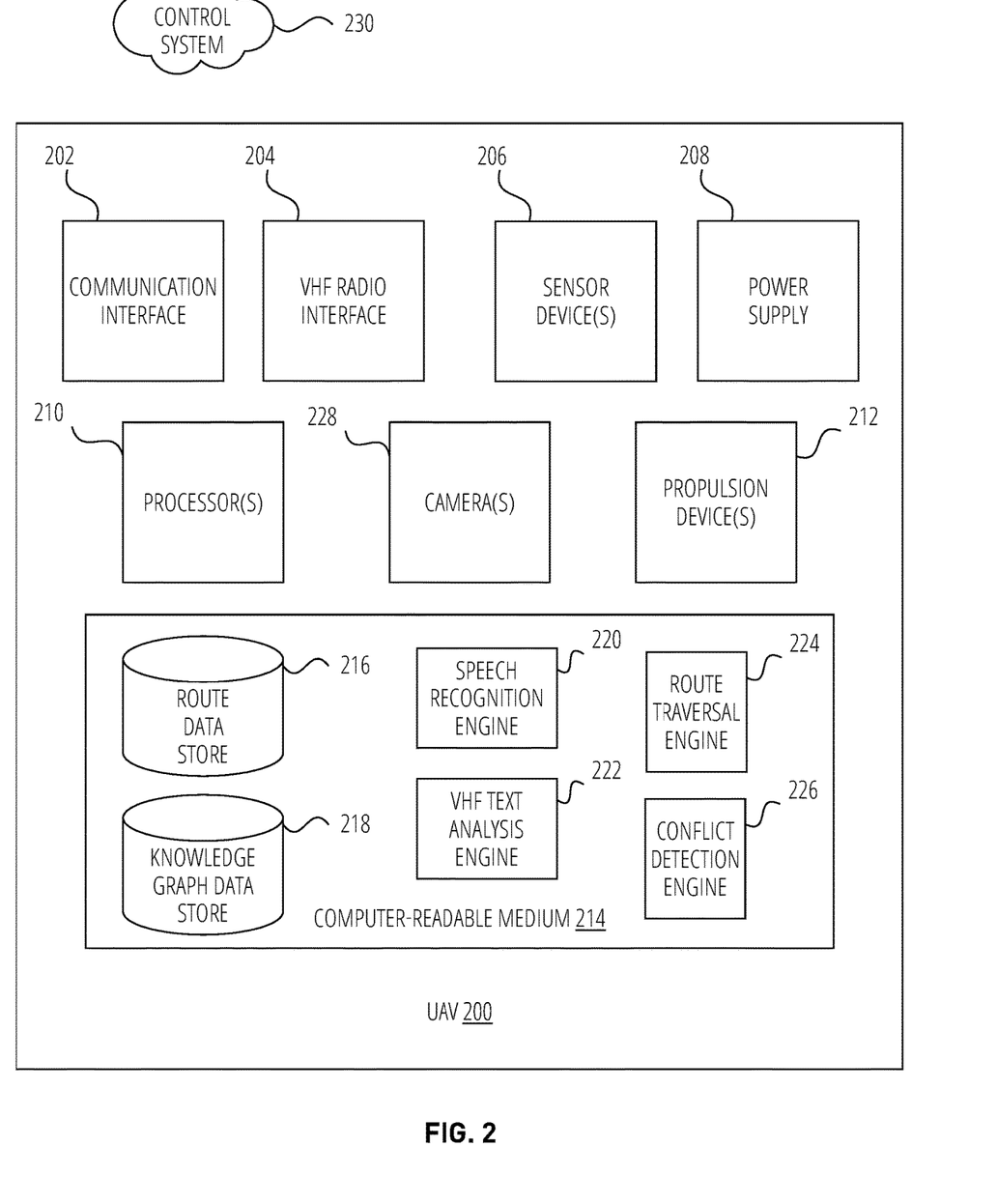
FIG. 2 is a block diagram that illustrates additional components of a non-limiting example embodiment of a UAV, in accordance with various embodiments of the disclosure.

FIG. 2 is a block diagram that illustrates a non-limiting example embodiment of a UAV according to various aspects of the present disclosure. In some embodiments, the UAV 200 is an aircraft such as the UAV 105 illustrated in FIG. 1, or the UAV 500 illustrated in FIG. 5A and FIG. 5B, which will be described in detail below.

As shown, the UAV 200 includes a communication interface 202, a VHF radio interface 204, one or more sensor devices 206, a power supply 208, one or more processors 210, one or more propulsion devices 212, a computer-readable medium 214, and one or more cameras 228.

In some embodiments, the communication interface 202 includes hardware and software to enable any suitable communication technology for communicating with a control system 230 (e.g., a fleet management system) located remotely (e.g., a computing system located at the terminal area 100, at a central control center, generally in the cloud, etc.). The control system 230 can include processors, communication interfaces, sensor propulsion devices, data stores, computer-readable media, and software configured to communicate with the UAV to provide, e.g., route data, knowledge graph data, and other instructions. In some embodiments, the communication interface 202 includes multiple communication interfaces, each for use in appropriate circumstances. For example, the communication interface 202 may include a long-range wireless interface such as a 4G or LTE interface, or any other type of long-range wireless interface (e.g., 2G, 3G, 5G, or WiMAX), to be used to communicate with the control system 230 while traversing a route. The communication interface 202 may also include a medium-range wireless interface such as a Wi-Fi interface to be used when the UAV 200 is at an area near a start location or an endpoint where Wi-Fi coverage is available. The communication interface 202 may also include a short-range wireless interface such as a Bluetooth interface to be used when the UAV 200 is in a maintenance location or is otherwise stationary and waiting to be assigned a route. The communication interface 202 may also include a wired interface, such as an Ethernet interface or a USB interface, which may also be used when the UAV 200 is in a maintenance location or is otherwise stationary and waiting to be assigned a route.

In some embodiments, the VHF radio interface 204 includes hardware and software to monitor and receive radio signals in the relevant VHF frequencies (in the range of radio frequency electromagnetic waves from 30 to 300 MHz). The VHF radio interface 204 can include a suitable antenna for receiving VHF radio waves by the UAV 200. VHF radio waves propagate mainly by line-of-sight, and in some cases can travel about 100 miles. In other embodiments, the radio interface can be adapted to receive any wireless radio communication transmitting audible speech format data.

In some embodiments, the sensor devices 206 are configured to detect states of various components of the UAV 200, sense signals around the UAV 200, and to transmit signals representing those states to other components of the UAV 200. Some non-limiting examples of sensor device 206 include a battery state sensor and a propulsion device health sensor. The sensor devices 206 may also include a GNSS sensor, one or more accelerometers (and/or other devices that are part of an inertial navigation system), LIDAR devices, radar devices, and/or other sensor devices for sensing an environment of the UAV 200. The environmental sensor devices can be configured to detect states of an environment surrounding the UAV 200. Some non-limiting examples of environmental sensor devices include a camera, a positioning system sensor device (such as a GPS sensor), a compass, an accelerometer, an altimeter, and an airspeed sensor device, and an ADS-B receiver device configured to receive ADS-B In messages from other aircraft.

In some embodiments, the power supply 208 may be any suitable device or system for storing and/or generating power. Some non-limiting examples of a power supply 208 include one or more batteries, one or more solar panels, a fuel tank, and combinations thereof. In some embodiments, the propulsion devices 212 may include any suitable devices for causing the UAV 200 to travel along the path. For an aircraft, the propulsion device 212 may include devices such as, but not limited to, one or more motors, one or more propellers, and one or more flight control surfaces (see, e.g., the propulsion units 508 and 512 of the UAV 500 of FIG. 5A and FIG. 5B.

In some embodiments, the processor 210 may include any type of computer processor capable of receiving signals from other components of the UAV 200 and executing instructions stored on the computer-readable medium 214. In some embodiments, the computer-readable medium 214 may include one or more devices capable of storing information for access by the processor 210. In some embodiments, the computer-readable medium 214 may include one or more of a hard drive, a flash drive, an EEPROM, and combinations thereof.

In some embodiments, the processor 210 can include any suitable type of general-purpose computer processor. In some embodiments, the processor 210 can include one or more special-purpose computer processors or AI accelerators optimized for specific computing tasks, including but not limited to graphical processing units (GPUs), vision processing units (VPTs), and tensor processing units (TPUs).

In some embodiments, the one or more cameras 228 can include any suitable type of camera for capturing imagery from the point of view of the UAV 200. For example, the cameras 228 may include one or more of a downward-facing camera or an angled-view camera. In some embodiments, the one or more cameras 228 may include one or more cameras of any type, including but not limited to a visible light camera, an infrared camera, a light-field camera, a laser camera, and a time-of-flight camera.

As shown, the computer-readable medium 214 has stored thereon a route data store 216, a knowledge graph data store 218, a speech recognition engine 220, a VHF text analysis engine 222, a route traversal engine 224, and a conflict detection engine 226. As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the route data store 216 is configured to store data related to the route of the UAV 200 that can be accessed by the route traversal engine 224 during use of the UAV 200. In some embodiments, the knowledge graph data store 218 is configured to store data related to a knowledge graph containing information about the environment in which the UAV 200 may travel (e.g., a micro knowledge graph of the airspace surrounding the approach route 104 and the return route 106 of the UAV 105 of FIG. 1, which can be a subset of an expanded regional, national, or international knowledge graph). In this regard, the knowledge graph can be constructed using a variety of data sources to provide the UAV 200 with more complete information about the location of static obstacles and the position/planned route of dynamic obstacles that may be encountered by the UAV 200 during use.

The knowledge graph can include location information for static obstacles received by a mapping or topography data source, and information for dynamic obstacles (current traffic airspace) based on one or more of ADS-B data, radar data, and wireless (VHF) radio data. During use, the UAV 200 can receive data to supplement the knowledge graph stored in the knowledge graph data store 218. In an autonomous UAV embodiment, the sensor device 206 may receive an ADS-B message (or radar data) related to the identification, position, heading, and velocity of an aircraft in the environment of the UAV 200 and transfer this information to revise and update the knowledge graph in the knowledge graph data store 218. In another embodiment where the UAV is dependent on receiving knowledge graph data from an outside source (e.g., the control system 230 located at the terminal area 100, at a central control center, generally in the cloud, etc.), the sensor device 206 may receive the ADS-B message (or radar data) related to the position, heading, and velocity of an aircraft and transmit the information to the control system 230 to revise and update the knowledge graph and then upload the new knowledge graph to the knowledge graph data store 218 of the UAV 200.

Similarly, in some embodiments, the VHF radio interface 204 may receive a wireless radio signal that includes audible speech from a pilot, air traffic control, or other personnel, and transfer the information to the speech recognition engine 220 for processing. The speech recognition engine 220 can use various transcription algorithms to analyze the audible speech format received by the VHF radio interface 204 and translate the audible speech format to text format. The speech recognition engine 220 can transmit the translated text format to the VHF text analysis engine 222 that interprets the translated text format to determine the identity of the craft, match the identity to a data set for that craft in the knowledge graph (if applicable, or add data related to a new craft identity), and revise/update the knowledge graph with relevant flightpath, destination, and/or pilot intent data related to the craft. As with the ADS-B data, revising and updating the knowledge graph can be autonomous to the UAV 200, or can be performed remotely by an outside system (e.g., the control system 230 located at the terminal area 100, at a central control center, generally in the cloud, etc.). In some embodiments using high-speed UAVs, autonomous processing of the audible speech format received by the VHF radio interface 204 can result in quicker processing and improved DAA.

Once the UAV has received and processed the audible speech, the UAV can broadcast the data to other UAVs and/or the control system 230. The audible speech format received by the VHF radio interface 204 can include, e.g., speaker's identification, aircraft identification/tail number, call sign, reference points, airports, landmarks, navigational aids, estimated relative distance and direction, current altitude, heading, speed, weather reports, and future intended position, among other information. The VHF text analysis engine 222 can be configured to interpret the different types of information to decode the message for revision of the knowledge graph, as will be described in detail with reference to FIG. 4A. Although described herein as a VHF text analysis engine for purposes of the present disclosure, embodiments of the technology disclosed herein are capable of interpreting translated text format from other wireless data sources (radio, medium-range wireless (Wi-Fi), long-range wireless (2G, 3G, 4G, 5G, LTE, WiMAX, etc.)

In some embodiments, the route traversal engine 224 is configured to cause the propulsion device 212 to propel the UAV 200 through planned routes stored in the route data store 216, and to take action to avoid conflicts detected by the conflict detection engine 226. The route traversal engine 224 can additionally use signals from other devices, such as GPS sensor devices, vision-based navigation devices, accelerometers, LIDAR devices, and/or other devices that are not illustrated or described further herein, to assist in positioning and navigation as is typical for a UAV 200. In some embodiments, the conflict detection engine 226 is configured as a deconfliction module to use information from the route data store 216, the knowledge graph data store 218, and/or the sensor devices 206 to detect conflict and alert the route traversal engine 224 when conflict avoidance maneuvers should be performed (DAA algorithm). In some embodiments, the UAV can communicate the DAA action (deconfliction plan) to other aircraft in the area. For example, upon detection of the flightpath 122 of the airplane 120 of FIG. 1, the UAV 105 can transmit an acknowledgement message over, e.g., VHF, to the pilot of the airplane 120 and communicate that the UAV will, e.g., descend and land or follow the adjusted return route 106b as a deconfliction action with the airplane 120.

As used herein, "engine" refers to logic embodied in hardware or software instructions, which can be written in one or more programming languages, including but not limited to C, C++, C #, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3:
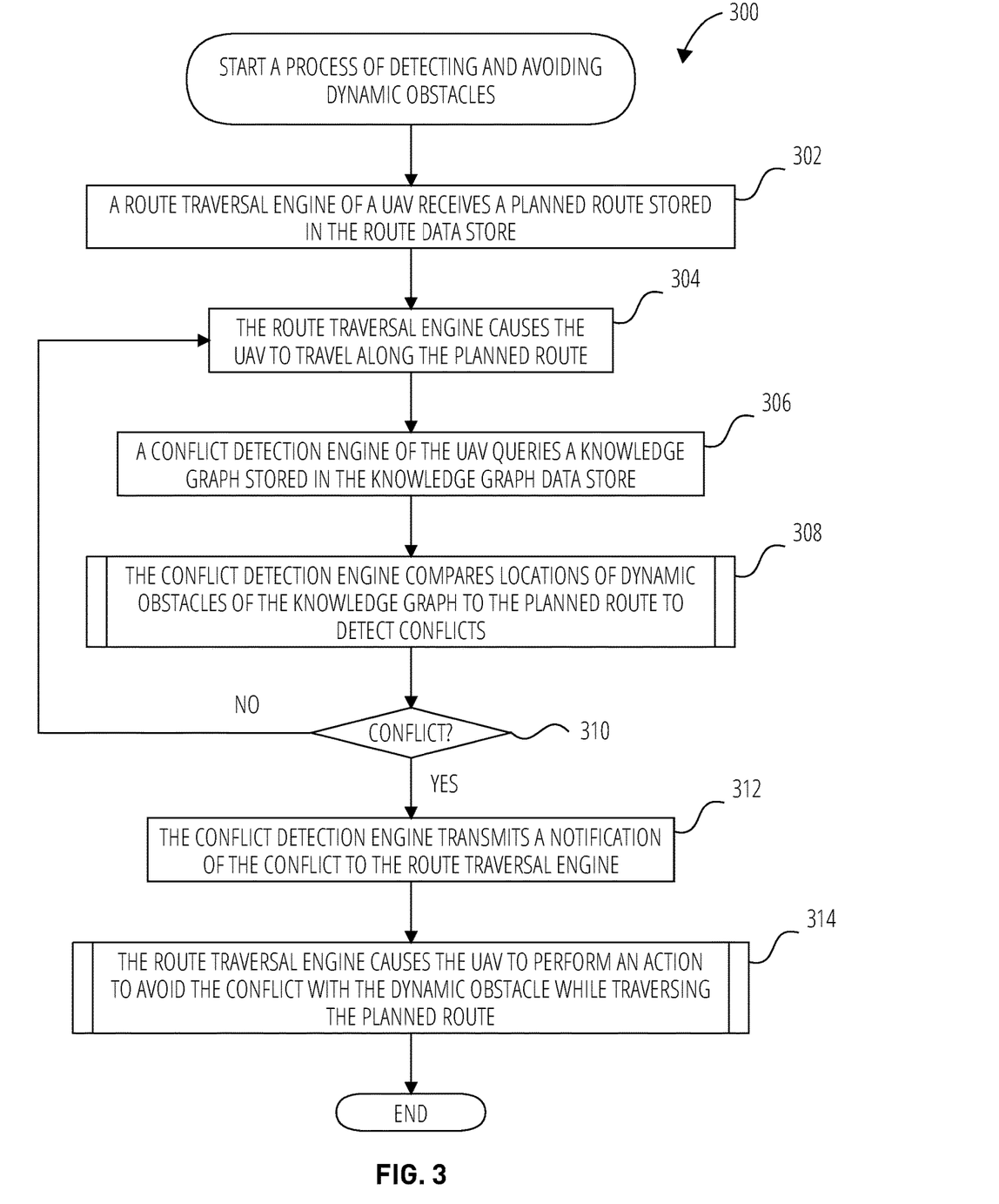
FIG. 3 includes a flow chart of a process for detecting and avoiding dynamic obstacles according to various aspects of the present disclosure.

FIG. 3 is a flow chart of a process 300 for detecting and avoiding dynamic obstacles, such as the airplane 120 by UAVs 105, the process using, in part, speech recognition, in accordance with an embodiment of the disclosure. In the process 300, the UAV queries a knowledge graph and compares the location of dynamic obstacles in the knowledge graph to a planned route, and if a conflict is detected, the UAV takes an avoidance action. The order in which some or all of the process blocks appear in the process 300 should not be deemed limiting. Rather, one of ordinary skill in the art having the benefit of the present disclosure will understand that some of the process blocks may be executed in a variety of orders not illustrated, or even in parallel. Although the following description may reference the UAV 105 of FIG. 1 or the UAV 200 of FIG. 2, the process 300 may be suitable for use with any UAV configuration and/or other aircraft.

From a start block, the process 300 proceeds to block 302, where a route traversal engine (e.g., the route traversal engine 224) of a UAV (e.g., the UAV 200) receives a planned route. In some embodiments, the route traversal engine saves the planned route in the route data store (e.g., the route data store 216). The route traversal engine may receive the planned route from a fleet management system (e.g., the control system 230) via wireless communication, wired communication, or any other suitable technique, such that the fleet management system may reserve areas of airspace during the planned route to prevent conflicts between UAVs managed by the fleet management system and obstacles (e.g., static and dynamic obstacles). However, this embodiment should not be seen as limiting. In some embodiments, the planned route may be transmitted to the route traversal engine via a different type of system, including but not limited to a controller terminal. In some embodiments, the planned route may include one or more waypoints indicating locations the UAV should travel through to follow the planned route. In some embodiments, the planned route may include an end location, and the route traversal engine may autonomously determine a planned route to reach the end location.

At block 304, the route traversal engine causes the UAV to travel along the planned route. In some embodiments, the route traversal engine uses signals from sensor devices (e.g., the sensor device 206), such as GPS location signals, aerial camera imagery, etc., to autonomously cause the UAV to travel along the planned route.

At block 306, a conflict detection engine (e.g., the conflict detection engine 226) of the UAV queries a knowledge graph stored in a knowledge graph data store (e.g., the knowledge graph data store 218). The knowledge graph may be transmitted by the fleet management system and received by the sensor devices of the UAV and provided to the conflict detection engine.

The process 300 proceeds from block 306 to subroutine block 308, where a procedure is conducted wherein the conflict detection engine compares locations of dynamic obstacles of the knowledge graph to the planned route to detect conflicts. Any suitable procedure for detecting conflicts based on the knowledge graph may be used.

At decision block 310, a determination is made regarding whether the procedure conducted at subroutine block 308 detected any conflicts. If no conflicts were detected, then the result of decision block 310 is NO, and the process 300 returns to block 304 to continue to travel along the planned route. In some embodiments, the conflict detection engine may query the knowledge graph multiple times during the remainder of the planned route (e.g., with a frequency of one cycle every ten seconds, one cycle every five seconds, one cycle per second, four cycles per second, ten cycles per second, and 50 cycles per second, etc.).

Returning to decision block 310, if a conflict was detected, then the result of decision block 310 is YES, and the process 300 advances to block 312, where the conflict detection engine transmits a notification of the conflict to the route traversal engine. The process 300 then advances to subroutine block 314, where a procedure is conducted wherein the route traversal engine causes the UAV to perform an action to avoid the conflict with the dynamic obstacle while traversing the planned route. Any suitable procedure for avoiding the conflict while traversing the planned route may be used.

The term "dynamic obstacle" simply denotes a moving obstacle (aircraft, UAV, vehicle, watercraft, etc.) that may conflict with the planned route of the UAV. In some embodiments, the UAV may re-transmit the conflict to the fleet management system to allow the fleet management system to generate planned routes for other controlled UAVs in the fleet that avoid predictable locations for dynamic obstacles.

The process 300 then proceeds to an end block and terminates. One will recognize that although the process 300 as illustrated shows the notification of the conflict being transmitted to the route traversal engine as soon as the conflict is detected, in some embodiments, the conflict detection engine may detect an existence of a future conflict, and may continue to monitor the existence of the future conflict until a time when an avoidance action has to be taken in order to avoid the conflict, at which point the conflict detection engine will transmit the notification of the conflict to the route traversal engine. By monitoring the existence of the future conflict until the time when the avoidance action has to be taken, the UAV can avoid taking avoidance actions in response to low-likelihood conflicts that turn out to be resolved before the avoidance action has to be taken.

Figure 4A:
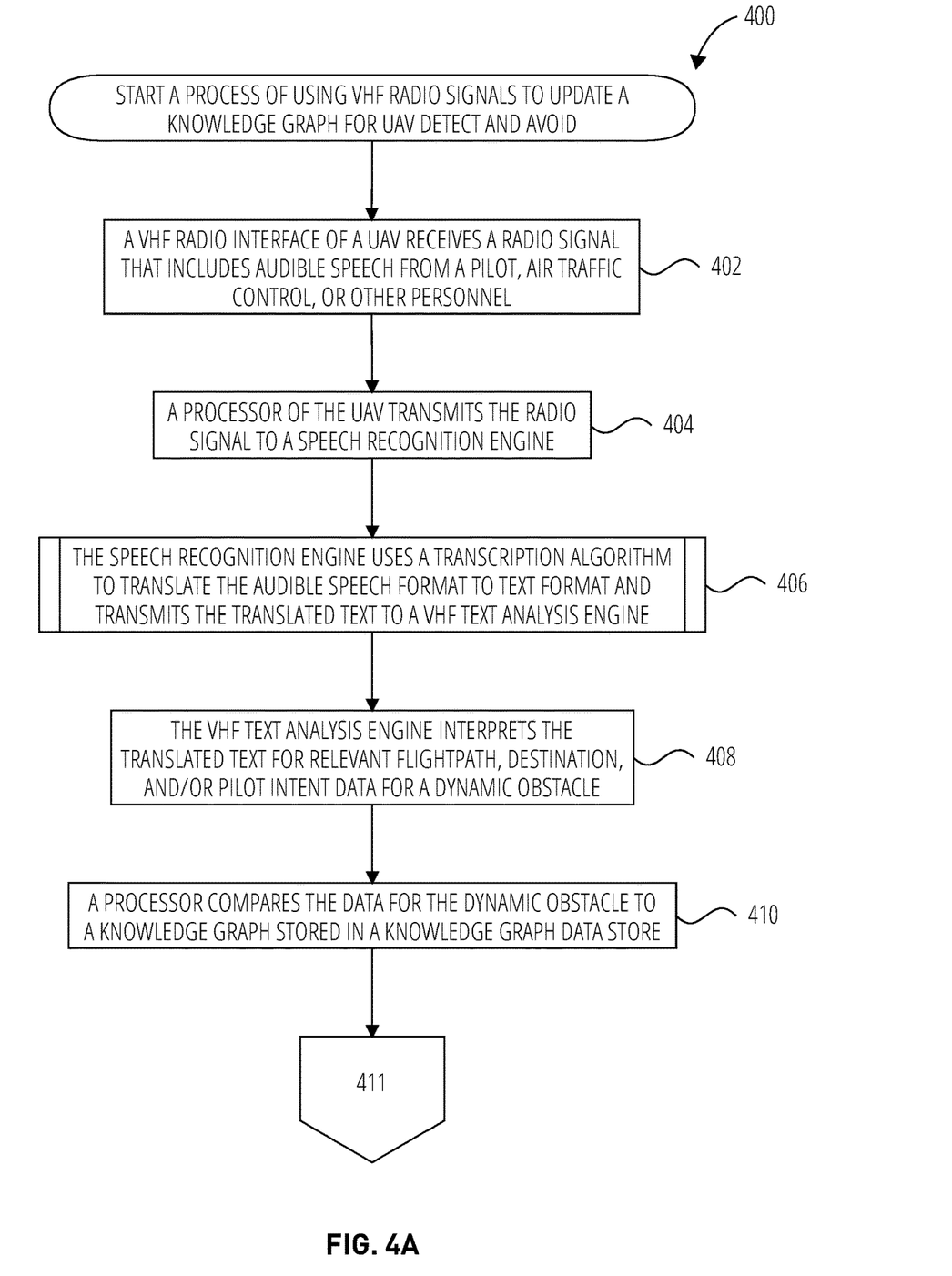
FIG. 4A and FIG. 4B include a flow chart of a process for using VHF radio signals to update a knowledge graph for detect and avoid according to various embodiments of the disclosure.
Figure 4B:
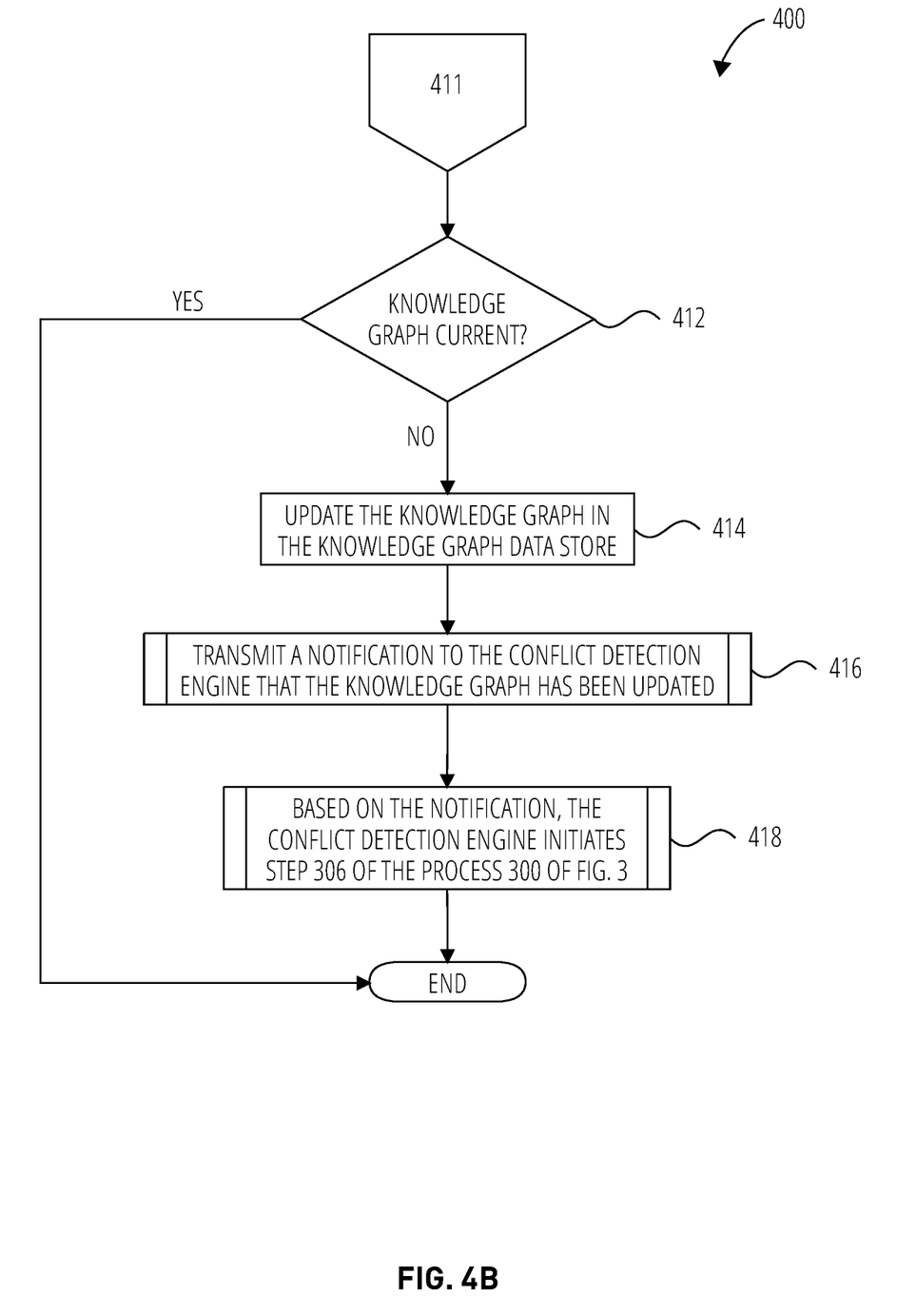

FIG. 4A and FIG. 4B illustrate a flow chart of a process 400 for using VHF radio signals to update a knowledge graph for DAA, such as the knowledge graph stored in the knowledge graph data store 218 of the UAV 200, in accordance with an embodiment of the disclosure. In the process 400, the UAV receives a radio signal including audible speech, a speech recognition engine translates the audible speech format to text format that is interpreted by a VHF text analysis engine, compares the data for the dynamic obstacle to the knowledge graph, and updates the knowledge graph if it is no longer current. The order in which some or all of the process blocks appear in the process 400 should not be deemed limiting. Rather, one of ordinary skill in the art having the benefit of the present disclosure will understand that some of the process blocks may be executed in a variety of orders not illustrated, or even in parallel. Although the following description may reference on a knowledge graph data store 218 of a UAV, the process 300 may be suitable for use with a knowledge graph stored remotely (e.g., at a fleet management system, computing system, in the cloud, etc.).

From a start block, the process 400 proceeds to block 402, where a vhf radio interface (e.g., the VHF radio interface 204) of a UAV receives a radio signal that includes audible speech from a pilot, air traffic control, or other personnel. In some embodiments, the VHF radio interface can be configured to constantly monitor the VHF band radio signals and alert a processor (e.g., the processor 210) of the UAV when a signal is received.

At block 404, the processor of the UAV transmits the radio signal to a speech recognition engine (e.g., the speech recognition engine 220 or a speech recognition engine located remotely). At subroutine block 406, the speech recognition engine uses a transcription algorithm to translate the audible speech format to text format. In some embodiments, the text can provide further details about the position, velocity, flightpath, destination, and/or pilot intent of a dynamic obstacle (e.g., an aircraft, watercraft, etc.) that may conflict with the planned route described with reference to FIG. 3. The speech recognition engine can be configured to translate audible speech format even in view of the relatively low quality of audio (static, uncommon speech patterns, accents, different voices, etc.). The transcription algorithms may use phrase detection, typical message structure or grammar, keywords, landmark recognition, entity recognition, geographic features, and other strategies to limit the search space necessary and improve accuracy while converting the audible speech format into text format. In an example, the transcription algorithm may recognize a repeated voice and tie the audible speech to the same dynamic obstacle, even if subsequent audible speech does not identify the craft. After translation, the speech recognition engine transmits the translate text to a VHF text analysis engine (e.g., the VHF text analysis engine 222).

At block 408, the VHF text analysis engine interprets the translated text and analyzes the text for relevant flightpath, destination, and/or pilot intent data for a dynamic obstacle. At block 410, a processor compares the data for the dynamic obstacle to a knowledge graph stored in a knowledge graph data store (e.g., the knowledge graph data store 218 of the UAV or a remote knowledge graph data store). In some embodiments, the processor at block 410 is a processor local to the UAV (e.g., the processor 210), or a processor remote to the UAV, such as a processor of a computing system of the fleet management system, etc. During comparison of the data for the dynamic obstacle to the knowledge graph, the processor may first query whether the dynamic obstacle is included in the knowledge graph and then add the new dynamic obstacle if appropriate, or if the dynamic obstacle already exists, check whether the data matches the data based on the translated text and update the knowledge graph as appropriate. In this regard, one of the position, velocity, flightpath, destination, and/or pilot intent of a dynamic obstacle may be different than what is stored in the knowledge graph and can be updated to reflect the most recently available data.

The process 400 continues to block 412 in FIG. 4B (see off page reference 411), where a determination is made regarding whether the procedure conducted at block 410 determined if the knowledge graphss is current (e.g., matches the data from the VHF audible speech translated text). If the knowledge graph is current, then the result of decision block 412 is YES, and the process 400 proceeds to an end block and terminates. If the knowledge graph is not current, then the result of decision block 412 is NO, and the process proceeds to block 414 where the knowledge graph is updated in the knowledge graph data store. In embodiments where the knowledge graph is stored remotely from the UAV, the updated knowledge graph can be pushed to the UAV, e.g., to assist the UAV in DAA such as while running the process 300.

At subroutine block 416, a notification is transmitted to the conflict detection engine that the knowledge graph has been updated, and at subroutine block 418, based on the notification, the conflict detection engine may initiate block 306 of the process 300 of FIG. 3 to run the DAA query (e.g., blocks 306 to 310).

Figure 5A:
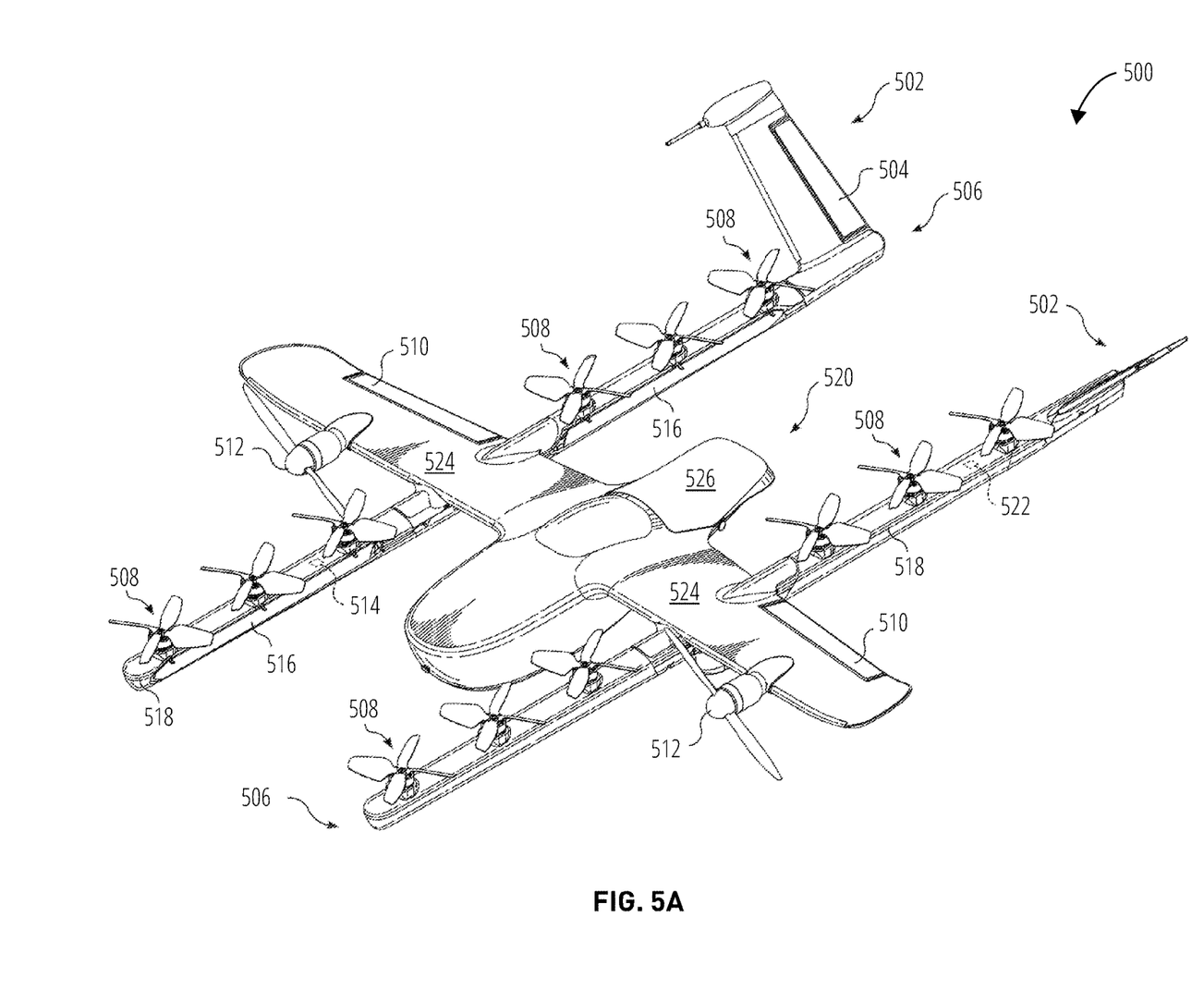
FIG. 5A and FIG. 5B are topside perspective view and bottom side plan view illustrations, respectively, of a UAV that avoids obstacles using a DAA system having speech recognition, in accordance with various embodiments of the disclosure.
Figure 5B:
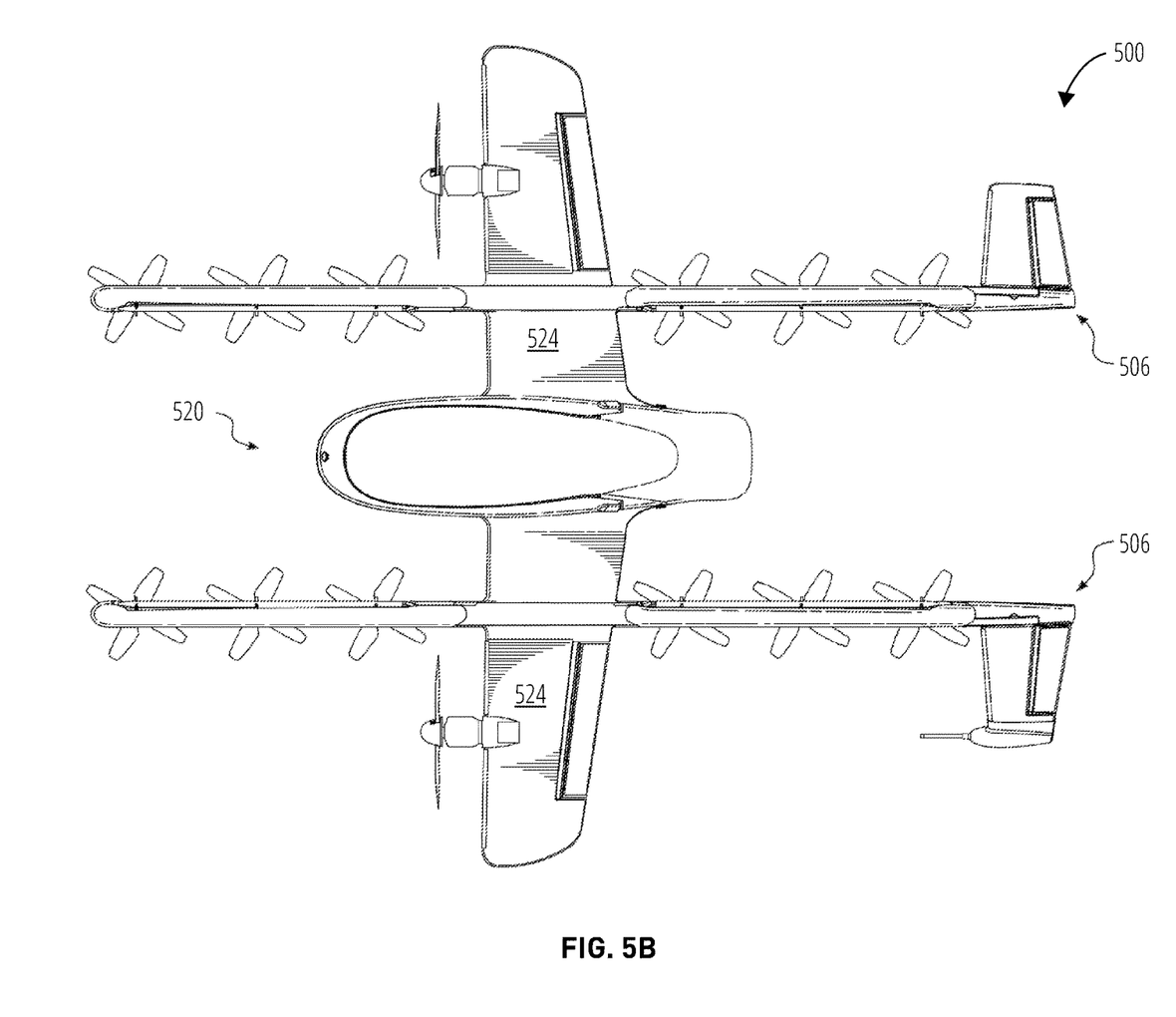

FIG. 5A and FIG. 5B illustrate an aerial vehicle or UAV 500 that is well suited for delivery of packages, in accordance with an embodiment of the present disclosure. FIG. 5A is a topside perspective view illustration of the UAV 500 while FIG. 5B is a bottom side plan view illustration of the same. The UAV 500 is one possible implementation of the UAVs 105 illustrated in FIG. 1, although other types of UAVs may be implemented as well.

The illustrated embodiment of the UAV 500 is a vertical takeoff and landing (VTOL) UAV that includes separate propulsion units 508 and 512 for providing vertical and horizontal propulsion, respectively. The UAV 500 is a fixed-wing aerial vehicle, which as the name implies, has a wing assembly 524 that can generate lift based on the wing shape and the vehicle's forward airspeed when propelled horizontally by the propulsion units 512. The illustrated embodiment of the UAV 500 has an airframe that includes a fuselage 520 and the wing assembly 524. In one embodiment, the fuselage 520 is modular and includes a battery module, an avionics module, and a mission payload module. These modules are detachable from each other and mechanically securable to each other to contiguously form at least a portion of the fuselage 520 or UAV main body.

The battery module (e.g., fore portion of the fuselage 520) includes a cavity for housing one or more batteries for powering the UAV 500. The avionics module (e.g., aft portion of the fuselage 520) houses flight control circuitry of the UAV 500, which can include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). Collectively, these functional electronic subsystems for controlling the UAV 500, communicating, and sensing the environment may be referred to as a control system 526. The mission payload module (e.g., middle portion of the fuselage 520) houses equipment associated with a mission of the UAV 500. For example, the mission payload module can include a payload actuator (not shown) for holding and releasing an externally attached payload. In another embodiment, the mission payload module can include a camera/sensor equipment holder for carrying camera/sensor equipment (e.g., camera, lenses, radar, LIDAR, pollution monitoring sensors, weather monitoring sensors, etc.). The onboard camera can support a computer vision system (e.g., stereoscopic machine vision) for visual triangulation and navigation as well as operate as an optical code scanner for reading visual codes affixed to packages. These visual codes may be associated with or otherwise match to delivery missions and provide the UAV 500 with a handle for accessing destination, delivery, and package validation information. Other components that can be carried by some embodiments of the UAV 500 are illustrated in FIG. 2.

The illustrated embodiment of the UAV 500 further includes the horizontal propulsion units 512 positioned on the wing assembly 524, which can each include a motor, shaft, motor mount, and propeller, for propelling the UAV 500 generally horizontally. The illustrated embodiment of the UAV 500 includes two boom assemblies 506 that secure to the wing assembly 524. The illustrated embodiments of the boom assemblies 506 each include a boom housing 518 in which a boom is disposed, the vertical propulsion units 508, printed circuit boards 516, and stabilizers 502. The vertical propulsion units 508 can each include a motor, shaft, motor mounts, and propeller, for providing vertical propulsion. The vertical propulsion units 508 can be used during a hover mode where UAV 500 is descending (e.g., to a delivery location) or ascending (e.g., following a delivery). The stabilizers 502 (or fins/tails) may be included with the UAV 500 to control pitch and stabilize the aerial vehicle's yaw (left or right turns) during cruise. In some embodiments, the UAV 500 may be configured to function as a glider. To do so, the UAV 500 may power off its propulsion units and glide for a period of time.

During flight, the UAV 500 may control the direction and/or speed of its movement by controlling its pitch, roll, yaw, and/or altitude. Thrust from the propulsion units 512 is generally horizontal and used to control air speed. For example, the stabilizers 502 may include one or more rudders 504 for controlling the aerial vehicle's yaw, and the wing assembly 524 may include elevators for controlling the aerial vehicle's pitch and/or ailerons 510 for controlling the aerial vehicle's roll. As another example, increasing or decreasing the speed of all the propellers simultaneously can result in UAV 500 increasing or decreasing its altitude, respectively. The UAV 500 may also include components for sensing the environment around the UAV 500, including but not limited to an audio sensor 522 and an audio sensor 514. Further examples of sensor devices are illustrated in FIG. 2 and described below. While the techniques described herein are particularly well-suited for VTOLs providing an aerial delivery service, it should be appreciated that supplementing other DAA technologies with speech recognition to identify air-based obstacles is applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIG. 5A and FIG. 5B illustrate one wing assembly 524, two boom assemblies 506, two horizontal propulsion units 512, and six vertical propulsion units 508 per boom assembly 506, it should be appreciated that other variants of the UAV 500 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of an unmanned aerial vehicle (UAV), causes the UAV to perform actions comprising:
    traveling along a planned route of the UAV;
    receiving, by a wireless radio interface of the UAV, a wireless radio signal containing new information related to a dynamic obstacle in an audible speech format;
    in response to receiving the wireless radio signal, updating a knowledge graph having stored information related to the dynamic obstacle, by:
        translating the audible speech format to a text format using speech recognition;
        analyzing the text format to determine an identity of the dynamic obstacle to which the new information is related;
        comparing the new information received in the audible speech format to the stored information related to the dynamic obstacle to detect changes; and
        in response to detecting changes, updating the knowledge graph with an updated flightpath or velocity of the dynamic obstacle based on the new information;
    querying the knowledge graph for the updated flightpath or velocity of the dynamic obstacle;
    comparing the updated flightpath or velocity of the dynamic obstacle to the planned route of the UAV; and
    in response to detecting a conflict between the dynamic obstacle and the UAV based on the comparing, performing an action by the UAV to avoid the conflict with the dynamic obstacle.

2. The non-transitory computer-readable medium of claim 1, wherein the wireless radio interface is a VHF radio interface, and wherein the wireless radio signal is a VHF radio signal.

3. The non-transitory computer-readable medium of claim 1, wherein updating the knowledge graph is performed autonomously by the UAV.

4. The non-transitory computer-readable medium of claim 2, wherein the updated knowledge graph is transmitted to a fleet management system.

5. The non-transitory computer-readable medium of claim 1, wherein updating the knowledge graph includes adding information related to a new dynamic obstacle when the determined identity does not match a dynamic obstacle currently stored in the knowledge graph.

6. The non-transitory computer-readable medium of claim 1, wherein the information related to the dynamic obstacle includes one or more of craft identification information, heading information, airspeed information, flightpath information, destination information, and pilot intent information.

7. The non-transitory computer-readable medium of claim 1, wherein the knowledge graph comprises information related to the dynamic obstacle received by the wireless radio signal and one or more of an ADS-B message and a radar signal.

8. The non-transitory computer-readable medium of claim 1, wherein the knowledge graph comprises information related to the dynamic obstacle received by an ADS-B message, and wherein the wireless radio signal includes different or additional information related to the dynamic obstacle.

9. The non-transitory computer-readable medium of claim 1, wherein the action of querying the knowledge graph is performed at a frequency selected from a group consisting of one cycle every ten seconds, one cycle every five seconds, one cycle per second, four cycles per second, ten cycles per second, and 50 cycles per second.

10. The non-transitory computer-readable medium of claim 1, wherein the action by the UAV to avoid conflict with the dynamic obstacle comprises:
    determining a safe landing location; and
    descending to land to deconflict with the dynamic obstacle.

11. The non-transitory computer-readable medium of claim 1, wherein the action by the UAV to avoid conflict with the dynamic obstacle comprises:
    adjusting the planned route to an adjusted planned route that deconflicts with the dynamic obstacle.

12. The non-transitory computer-readable medium of claim 1, wherein the new information related to the dynamic obstacle includes intent information of a pilot of the dynamic obstacle.

13. The non-transitory computer-readable medium of claim 12, wherein the intent information of a pilot of the dynamic obstacle includes one or more of an adjusted flightpath route, adjusted flightpath speed, and adjusted flightpath timing.

14. A method for detecting and avoiding a dynamic obstacle by an autonomous vehicle, the method comprising:
    controlling propulsion devices of the autonomous vehicle along a planned route;
    receiving, by a wireless radio interface of the autonomous vehicle, a wireless radio signal containing new information related to the dynamic obstacle in an audible speech format;
    in response to receiving the wireless radio signal, updating a knowledge graph having stored information related to the dynamic obstacle, by:
        translating the audible speech format to a text format using speech recognition;
        analyzing the text format to determine an identity of the dynamic obstacle to which the new information is related;

comparing the new information received in the audible speech format to the stored information related to the dynamic obstacle within a knowledge graph to detect changes; and in response to detecting changes, updating the knowledge graph with an updated flightpath or velocity of the dynamic obstacle based on the new information;

querying the knowledge graph for the updated flightpath or velocity of the dynamic obstacle;

comparing the updated flightpath or velocity of the dynamic obstacle to the planned route of the autonomous vehicle; and in response to detecting a conflict between the dynamic obstacle and the autonomous vehicle based on the comparing, controlling the propulsion devices to avoid conflict with the dynamic obstacle.

15. The method of claim 14, wherein the wireless radio signal is a VHF radio signal.

16. The method of claim 14, wherein updating the knowledge graph is performed autonomously by the autonomous vehicle.

17. The method of claim 16, wherein the updated knowledge graph is transmitted to a fleet management system.

18. The method of claim 14, wherein updating the knowledge graph includes adding information related to a new dynamic obstacle when the determined identity does not match a dynamic obstacle currently stored in the knowledge graph.

19. The method of claim 14, wherein the relevant information related to the dynamic obstacle includes one or more of craft identification information, heading information, airspeed information, flightpath information, destination information, and pilot intent information.

20. The method of claim 14, wherein the knowledge graph comprises information related to the dynamic obstacle received by an ADS-B message, and wherein the wireless radio signal includes different or additional information related to the dynamic obstacle.

21. The method of claim 14, wherein controlling the propulsion devices to avoid conflict with the dynamic obstacle comprises:

determining a safe landing location; and descending to land to deconflict with the dynamic obstacle.

22. The method of claim 14, wherein controlling the propulsion devices to avoid conflict with the dynamic obstacle comprises:

adjusting the planned route to an adjusted planned route that deconflicts with the dynamic obstacle.

23. The method of claim 14, wherein the knowledge graph is an on-board knowledge graph stored in a knowledge graph data store on the autonomous vehicle, and wherein the on-board knowledge graph is a subset of an expanded knowledge graph of a fleet management system.

24. The method of claim 14, wherein the new information related to the dynamic obstacle includes intent information of a pilot of the dynamic obstacle.

25. The method of claim 24, wherein the intent information of a pilot of the dynamic obstacle includes one or more of an adjusted flightpath route, adjusted flightpath speed, and adjusted flightpath timing.

* * * * *

UNITED STATES PATENT AND TRADEMARK OFFICE
CERTIFICATE OF CORRECTION

| | | |
|---|---|---|
| PATENT NO. | : 12,429,886 B2 | Page 1 of 1 |
| APPLICATION NO. | : 18/066220 | |
| DATED | : September 30, 2025 | |
| INVENTOR(S) | : John Mooney et al. | |

It is certified that error appears in the above-identified patent and that said Letters Patent is hereby corrected as shown below:

In the Claims

| Column | Line | |
|---|---|---|
| 13 | 65-66 | Claim 4, delete "claim 2," and insert -- claim 3, -- |

Signed and Sealed this
Ninth Day of December, 2025

John A. Squires
*Director of the United States Patent and Trademark Office*